United States Patent
Zoldi et al.

(10) Patent No.: US 11,093,988 B2
(45) Date of Patent: Aug. 17, 2021

(54) BIOMETRIC MEASURES PROFILING ANALYTICS

(71) Applicant: Fair Isaac Corporation, San Jose, CA (US)

(72) Inventors: Scott M. Zoldi, San Diego, CA (US); Stuart C. Wells, Sunnyvale, CA (US)

(73) Assignee: FAIR ISAAC CORPORATION, San Jose, CA (US)

( * ) Notice: Subject to any disclaimer, the term of this patent is extended or adjusted under 35 U.S.C. 154(b) by 892 days.

(21) Appl. No.: 14/613,300

(22) Filed: Feb. 3, 2015

(65) Prior Publication Data

US 2016/0225048 A1   Aug. 4, 2016

(51) Int. Cl.
  *G06Q 30/06* (2012.01)
  *G06K 9/00* (2006.01)
  *G06Q 20/40* (2012.01)

(52) U.S. Cl.
  CPC ..... *G06Q 30/0609* (2013.01); *G06K 9/00899* (2013.01); *G06Q 20/4016* (2013.01); *G06Q 20/40145* (2013.01)

(58) Field of Classification Search
  CPC ......... G06Q 30/0609; G06Q 20/40145; G06Q 20/4016; G06K 9/008899
  See application file for complete search history.

(56) References Cited

U.S. PATENT DOCUMENTS

| | | | | |
|---|---|---|---|---|
| 6,591,224 B1 * | 7/2003 | Sullivan | ................... | G07C 9/37 |
| | | | | 702/179 |
| 2006/0149544 A1 * | 7/2006 | Hakkani-Tur | .......... | G10L 15/22 |
| | | | | 704/236 |
| 2006/0282660 A1 * | 12/2006 | Varghese | ........... | G06Q 20/4016 |
| | | | | 713/155 |

(Continued)

OTHER PUBLICATIONS

A. Hodge, Victoria, and Jim Austin. "A survey of outlier detection methodologies." Artificial intelligence review 22, No. 2 (2004): 85-126. (Year: 2004).*

(Continued)

*Primary Examiner* — Mike Anderson
*Assistant Examiner* — James H Miller
(74) *Attorney, Agent, or Firm* — Mintz, Levin, Cohn, Ferris, Glovsky and Popeo, P.C; Michael Van Loy; Paul Brockland (57) ABSTRACT

A biometric measures profiling analytics system and method are presented. The system and method include collecting biometric data associated with a consumer, and determining one or more biometric variables representing a measurable aspect of the biometric data. The system and method further include generating, based on at least one of the one or more biometric variables, at least one biometric profile variable associated with the consumer, the at least one biometric profile variable representing a degree of normality or abnormality of the collected and calibrated biometric data as compared to a biometric history of the consumer. The system and method further include generating a behavioral (Continued)

score for the consumer based on the collected and calibrated biometric data and with at least one biometric profile variable, the behavioral score representing a degree of risk of normality or abnormality of an event associated with the biometric data.

23 Claims, 4 Drawing Sheets

(56) References Cited

U.S. PATENT DOCUMENTS

| | | | |
|---|---|---|---|
| 2007/0233614 A1 | 10/2007 | McNelley et al. | |
| 2008/0077515 A1* | 3/2008 | Zoldi | G06Q 40/00 705/35 |
| 2009/0222243 A1* | 9/2009 | Zoldi | G06Q 10/04 703/2 |
| 2009/0222369 A1* | 9/2009 | Zoldi | G06Q 10/10 705/35 |
| 2010/0094791 A1* | 4/2010 | Miltonberger | G06Q 20/4016 706/46 |
| 2010/0228580 A1* | 9/2010 | Zoldi | G06Q 40/025 705/38 |
| 2011/0016534 A1* | 1/2011 | Jakobsson | G06F 21/316 726/28 |
| 2011/0166979 A1* | 7/2011 | Zoldi | G06Q 40/04 705/35 |
| 2013/0102283 A1* | 4/2013 | Lau | H04W 4/02 455/411 |
| 2013/0204755 A1* | 8/2013 | Zoldi | G06Q 40/02 705/30 |
| 2014/0337225 A1 | 11/2014 | Van Heerden et al. | |
| 2015/0188913 A1* | 7/2015 | Teixeron | H04L 63/0838 713/155 |

OTHER PUBLICATIONS

Hodge, Victoria, and Jim Austin. "A survey of outlier detection methodologies." Artificial intelligence review 22, No. 2 (2004): 85-126. (Year: 2004).*

Tierney, Luke. "A space-efficient recursive procedure for estimating a quantile of an unknown distribution." SIAM Journal on Scientific and Statistical Computing 4, No. 4 (1983): 706-711. (Year: 1983).*

Chen, Fei, Diane Lambert, and José C. Pinheiro. "Incremental quantile estimation for massive tracking." In Proceedings of the sixth ACM SIGKDD international conference on Knowledge discovery and data mining, pp. 516-522. 2000 (Year: 2000).*

Cahill, Michael H., Diane Lambert, José C. Pinheiro, and Don X. Sun. "Detecting fraud in the real world." In Handbook of massive data sets, pp. 911-929. Springer, Boston, MA, 2002 (Year: 2002).*

* cited by examiner

| Index | number |
|---|---|
| 1 | 1111 |
| 2 | 2222 |
| ... | ... |
| 11 | 1234 |
| 12 | 2323 |
| 13 | 3434 |
| 14 | 4321 |

| Index | Frequency |
|---|---|
| 1 | 0.2 |
| 2 | 0.7 |
| ... | ... |
| 11 | 3.1 |
| 12 | 0.9 |
| 13 | 2.3 |
| 14 | 0.4 |

| Ranking | Index to number |
|---|---|
| 1 | 11 |
| 2 | 13 |
| ... | ... |
| 11 | 12 |
| 12 | 2 |
| 13 | 14 |
| 14 | 1 |

Fraud Table

| F | var1 | var2 | var3 | ... |
|---|------|------|------|-----|
| F | var1 | var2 | var3 | ... |
| F | var1 | var2 | var3 | ... |
| F | var1 | var2 | var3 | ... |
| F | var1 | var2 | var3 | ... |

| NF | var1 | var2 | var3 | ... |
|----|------|------|------|-----|
| NF | var1 | var2 | var3 | ... |
| NF | var1 | var2 | var3 | ... |
| NF | var1 | var2 | var3 | ... |

Non-Fraud Table

BIOMETRIC MEASURES PROFILING ANALYTICS

TECHNICAL FIELD

The subject matter described herein relates to biometric measurements, and more particularly to analytics systems and methods using biometric measures.

BACKGROUND

In the pursuit of identifying and stopping fraud, there has been an increased interest in using direct biometric information on a customer to help refine fraud decisions. Examples of this include geo-location, thumbprint/fingerprint, voiceprints, user gait, facial recognition, etc. Using such biometrics typically involves customer opt-in, correct user administration of the biometrics capture, and, typically, an inhomogeneous set of user capture devices and capabilities. This contributes to a variety of false positives associated with determining matching of the biometric markers. Further, the variety of opt-in processes due to privacy concerns, and the mix of biometrics collected results in users with either less biometrics captured, and/or different quality of capture, which further makes reliance on any particular biometric match difficult for the general population. Finally, a consistency among measurement devices varies considerably, making the use of biometrics difficult. Biometric matching that works in an experimental setting becomes difficult to implement operationally at reasonable false positives, particularly with a public that may resist the use of this information, and which has come to expect that capturing and disseminating biometric data not be present in the use of their payment cards when making a purchase.

As used herein, the term "friction" relates to how much a customer or user is encumbered by a process, or how or to what extent such person has to pay attention to the process. Hard matches with biometrics, although powerful indicators of correct identity, can often increase the friction of the customer experience with false positives and reduce adoption while driving customers to alternate account access and payment card experiences where there is less friction. Companies willing to risk a lower-friction use of biometric capture and lower false positives will result in better customer experiences and ultimately larger market share.

Practical and wide distribution use of biometric markers are best collected in less obtrusive ways to supplement already existing fraud measures, such as in the Falcon Manager Fraud product provided by Fair Isaac Corporation of San Jose, Calif. Here the quality of each individual's biometric data can be used and calibrated based on biometrics adopted/allowed, a user's proper use of biometric protocol, and device limitations to improve an existing fraud behavior score that was generated based on non-biometric transaction data. Analytics must be calibrated based on the user's own biometric measures history and the stability of those measures over time. In this fashion, the biometric measures and the quality of this information can supplement a highly predictive fraud score and can raise (more fraud risk) or lower the score based on the trending of recently and preferably low-friction biometric data collected. In cases where the biometric data is inconclusive, the preexisting score is the dominant determination of fraud or non-fraud.

Accordingly, there is an increased interest in the use of biometric information to enhance fraud detection. Often the focus is on "high friction" biometric collection such as facial recognition, retinal scan, or handwriting analysis and utilizing match measures to a reference. Although these can be appropriate in specialized situations, such as government security, they are ill-suited to the general population's use of biometrics to improve fraud detection and authentication.

SUMMARY

This document describes the use of low-friction or no-friction biometric data gathering to construct one or more biometric measurement profile variables that track measurement data from no-friction, low-friction, and high-friction measurements to determine the typical values of these measures for each specific individual based on their adoption, implementation of the biometric measurement, and quality of capture device. Further, by utilizing Recursive Frequency lists and Global Quantile estimation, abnormality variables based on individual and global biometric profile variable measurement data can be constructed. Based on these unsupervised or supervised biometric profile analytic stand-alone scores, and a preferred blending of biometric profile measure analytics with existing fraud scores, specific actions can be generated based on biometrics measurements. Tailoring biometric measurement data and profiling the individual's biometric measurements over time allows the interpretation of the data to be based on the individual's past biometric measurements to increase accuracy and lower the false positives associated with use of biometrics data in fraud and authentication.

The biometric profiling data need not be restricted to fraud problems; the same change detection associated with fraud applications is important to understanding change in biometric indicators associated with customers, which may mean a number of things, such as they are in a location for the first time, having challenges matching biometrics, or in need of help/engagement. Archetypes of customers in the space of the biometric marker data captured can be learned and adjusted in real-time using streaming collaborative profiling technology. This allows customers to be segmented based on the biometrics captured and actions targeted based on the archetype(s) to which they belong. Further these customers can be monitored over time, and when biometric data indicates changes to a customer's archetypes, they enable an ability to interview or acknowledge a time of flux, which can be of critical importance in medical applications or strengthen relationships in the "Know Your Customers" (KYC) area.

In one aspect, a biometric measures profiling analytics system and method are presented. The system and method include collecting, by a capturing device connected with at least one programmable processor, biometric data associated with a consumer, and determining one or more biometric variables associated with the consumer, each of the one or more biometric variables representing a measurable aspect of the biometric data. The system and method further include generating, based on at least one of the one or more biometric variables, at least one biometric variable profile associated with the consumer, the at least one biometric variable profile representing a degree of normality or abnormality of the collected and calibrated biometric data as compared to a biometric history of the consumer. The system and method further include generating a behavioral score for the consumer based on a comparison of the collected and calibrated biometric data with the biometric variable profile, the behavioral score representing a degree of risk of normality or abnormality of an event associated with the biometric data.

Beyond the use of biometric measures in fraud detection applications to identify changes over time to determine normal or abnormal measurements, there is also a class of analytics that utilize biometric measures over time to derive archetypes of these biometric measures. These archetypes can be utilized to classify individuals based on their distribution in the learned archetypes to which they can be associated, or to understand changes in archetype distributions over time. These collaborative filtering techniques on the biometric measures allow more customer-aware analytic decisions, for example, in the area of medical intervention and monitoring, or marketing and/or receptiveness by consumers to outreach.

Implementations of the current subject matter can include, but are not limited to, systems and methods, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address the above-discussed issues, this document presents methods, systems, articles of manufacture, and the like, consistent with one or more implementations of the current subject matter to provide biometric measures profiling, and analytics using biometric measures profiling.

In accordance with some implementations, low-friction biometric data can include one or more of the following usage behaviors of a mobile device that can be collected based on user consent and done in the background although being conscious of the increased battery draws on the device:
  B-party (destination numbers) called
  B-party texts
  B-party MMS
  URL visited
  Apps running
  Data downloaded—such as slacker, Pandora, etc.
  Data requested
  Location lat/long
  Wifi networks connected
  Gyro position of the phone (how phone is held at angle)
  Step Motion on the phone (steps taken)
  Power on/Power off
  Jail Broken
  Sleep mode
  System setting changes
  Keystroke monitoring/swipes
  Etc.

High friction biometric data, by contrast, requires a customer to go through a procedure for collecting data such as finger prints, voice prints, facial recognition, retinal scan, genetic signature/DNA, swiping a code/signature on phone, entering a key phrase and monitoring typing speed, password authentication, etc. High friction biometric data can also include DNA signatures, blood glucose measurements, sweat analysis, oxygen ($O_2$) measurement, etc.

The lower the friction of biometric capture, the better the customer experience and the more likely that a user will opt-in to the collection of biometric data for use in improving a fraud decision or detection of a cybersecurity event. The analytics described below encompass low friction/no friction biometric capture, as well as higher-friction biometric measurement profiling analytics.

Many of the biometric data measures in the low-friction category can be collected as events occur, or as activity is polled on a regular basis (such as every 5, 15, 30 minutes, for example) to provide data that can be used to determine a normal or an abnormal use of the device. Determining a degree of abnormality requires that biometrics be collected to form a pattern of usage based on the user's past biometric measurements. This enables a determination of a typical value of the biometric measurements for the user and in the context of other users. Events that are consistent with the patterns of past use can help to reinforce a determination that a legitimate user is associated with a device, whereas those biometric measurements that are determined as not being consistent with frequent biometric capture data point to the possibility of use of the device by someone other than the legitimate, or a drastic change in that user's behavior. The determination of the normality or abnormality of the biometric measurement data of the device need not correlate to accuracy in match rate of a reference, but more importantly indicates typical biometric match levels over time, as an example a user with a consistent but low match rate of a metric may be considered normal. The determination of the normality or abnormality of the biometric measurement data of the device occurs in a real-time basis and can then be aligned with a risk decision, such as allowing a financial transaction to occur, a new application to be installed on the device, an online account to be accessed, or data transmitted to/from the device.

There are a variety of methods to determine whether biometric measurements are aligned with high recurrences of past biometric measurements for a user. In some implementations, as discussed below, a transaction profile-based recursive method enables real-time determination of repeated behaviors and real-time updating of tables that support the determination. In the description below, the term "number" can correspond to a variety of biometric measures, such as a dialed number (i.e., a mother's number), a number texted (i.e., best friend), data requested from an application (i.e., Slacker, Pandora, etc.), a location of the phone (i.e., a local shopping mall), a facial recognition match accuracy, voiceprint deviation, etc. All of these biometric measures can be characterized by numbers. Each of the biometric measures can have its own table that indicates typical past occurrences of the biometric data for a user over different time/event scales and/or day/time patterns. It should be noted that continuous valued numbers can be binned into value ranges to allow recurrences to be determined.

Determining Recurrence of Biometric Measures

In accordance with some preferred exemplary implementations, a Recursive Frequency List is generated, and which mathematically summarizes a device's various biometric measures history. One or more of these lists reside in the device profile and are maintained and updated with each new biometric measure data captured. The Recursive Frequency List utilizes the following three tables, stored in a device profile:

1. A table of n most frequent numbers (number table)
2. A table of pseudo-frequencies of the corresponding n most frequent numbers (frequency table)
3. A table of ranking for these numbers (ranking table)

Figure 1:
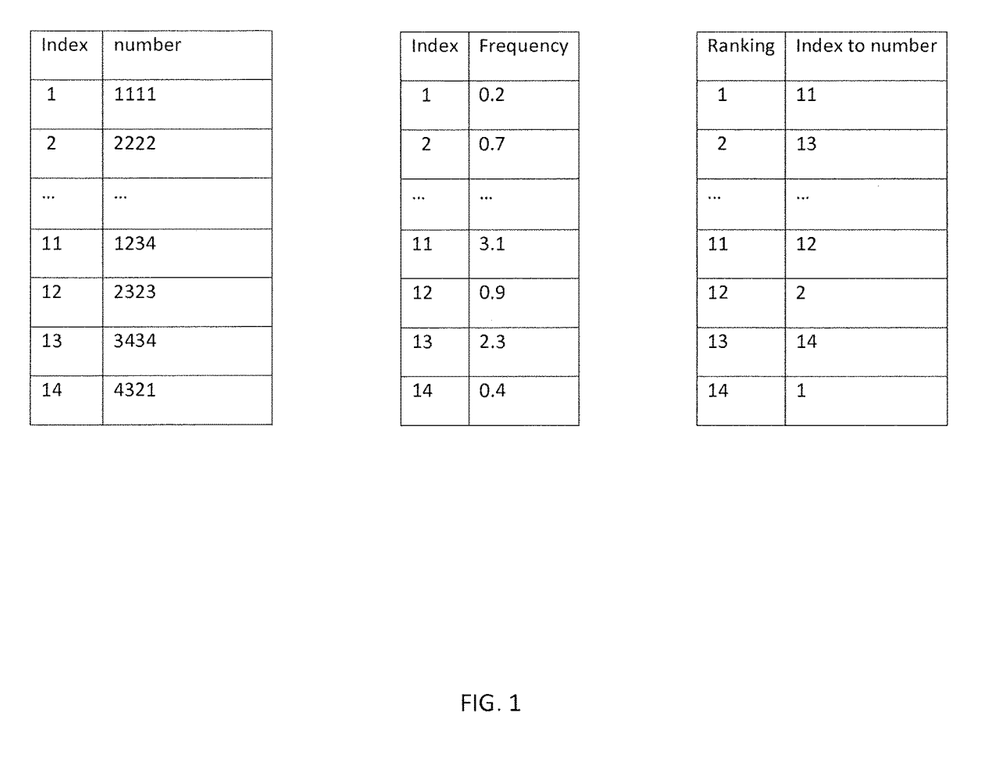
FIG. 1 illustrates a Recursive Frequency List example.

These three tables are collectively hereafter referred to as a Recursive Frequency List. It should be noted that the "frequencies" stored in the frequency table are not true "frequencies," but rather are pseudo-frequencies that approximate or estimate the true frequencies as applied over a decayed time or event window. FIG. 1 shows an example of a frequent-number list.

The Number Table and Frequency Table are coupled via common indices. From the above Number Table and Frequency Table, the frequency for number "1111" (with index 1 in the Number Table) is 0.2. The frequency for number "2222" (with index 2 in the Number table) has a frequency of 0.7. The frequency for number "4321" (with index 14) has a frequency of 0.4. The ranking table stores the common indices of number table and frequency table in the decreasing order of the frequency. For example, referring to the Ranking table, index 11 in the number table (corresponding to number "1234") has the highest frequency (3.1), index 13 (corresponding to the number "3434") the second-highest frequency (2.3), and so on.

Upon each new biometric measurement, the respective Number table is looked up to determine whether a biometric measurement value is frequently occurring for that user utilizing the rank of the number from the Ranking table. Then, one or more variables are calculated based on whether the current biometric measurement is frequent or not. Once the lookup is complete, the tables are updated as follows:

All frequencies in the Frequency table are decayed by a multiplicative factor $\beta$, $0<\beta<1$;

Then, the Number table and Frequency table are updated as follows:

If the current number is not in the Number table, then least-frequent number (determined by the Ranking table) is replaced with the current number if the least frequent number's frequency (based on the Frequency table) is less than a threshold $\delta$, $$0 < \delta < \frac{1}{1-\beta}$$

(NOTE: there are a multitude of other implementations for determining the threshold $\delta$ including use of adaptive thresholds based on match rates and recycling rates associated with the Number table). The frequency of the current number is initialized to be $\alpha$.

If the current number is already in the Number table, then its frequency is increased by $\lambda$ Finally, the Ranking table is updated to reflect any changes to the ranking of numbers in the Number Table based on the update.

"Frequencies" in the frequency table are not true frequencies, but are based on a ranking associated with the values $\alpha$, $\beta$, and $\lambda$ which are dependent on application and can vary based on the type of biometric measure variable being monitored in the Number table. This allows generation of a pattern of recent biometric measures so that analytics can be created around the current biometric measures in the context of the past biometric measures for a particular customer and their use of their device. A period of non-use or non-favorite use may be an indication of a change of user of the phone, which would add risk to subsequent authentication.

Biometric Measure Profile Variables Based on Recursive Frequency Lists: Individual's View In some implementations, a system uses one or more Recursive Frequency Lists, which helps determine normalcy patterns of past biometric measures, and allows current biometric measurement data to be cast in the view of a recent history of biometric measures made on the device. This in turn enables patterns of a user's "normalcy" of biometric measures to be recursively self-learned in the Recursive Frequency List contained in the device profile. As an example, a device that is used by a school child that has a limited set of locations/trajectories traveled during a school week will be highly stereotyped in location, but perhaps less so stereotyped in application downloads. In contrast, a traveling salesperson whose locations change rapidly and varied are not necessarily recurrent, but whose usage of the phone in terms of applications utilized (such as airline and travel applications and texting back to family friends) could be highly normalized, while location and travel trajectory is out of pattern. Variables that track how matches on the Recursive Frequency List occur are important in understanding the value of each biometric measurement and associated measures variables for each particular user.

Figure 2:
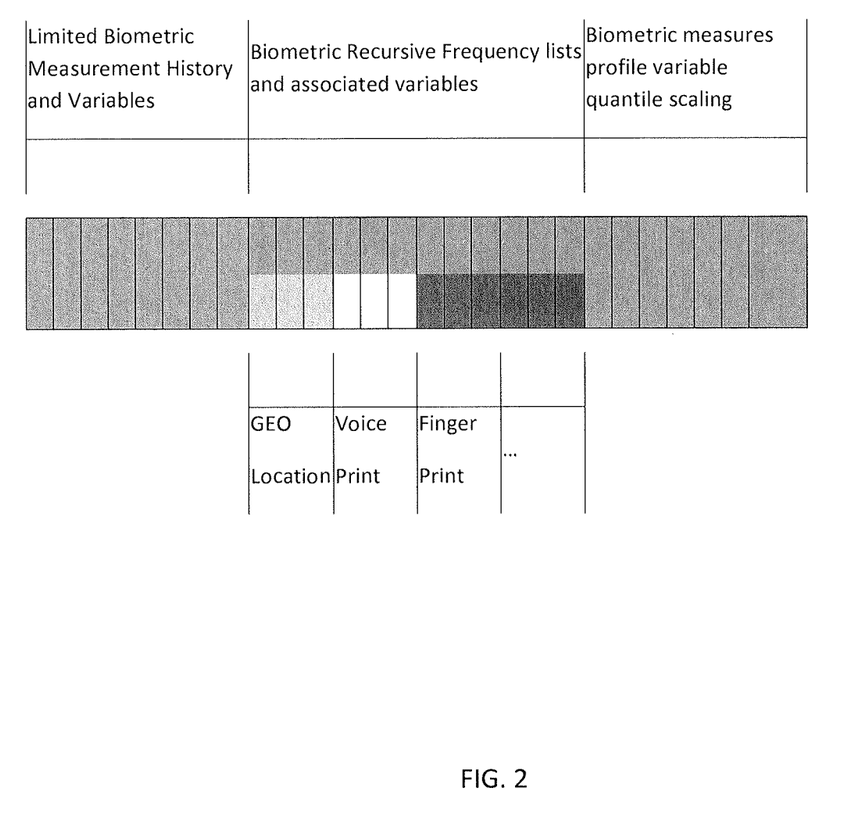
FIG. 2 illustrates a biometric measures profile containing a limited biometric measurement history, biometric Recursive Frequency Lists and variables, and biometric measures with quantile scaling based on associated peer groups and globally.

As illustrated, variables such as IN_TOP_5 and IN_Number_LIST are transaction-based measures. Variables such as IN_TOP_5_10Events or IN_NUMBER_LIST_1Week track historical trends of the biometric measure values for a user over a number of biometric measurements or over time. Variables such as IN_TOP_5_3EVENTS/IN_TOP_5_10EVENTS measure deviations in the matching of biometric values of the user over recent measurements. It is important to note that these variables are not based on a notion necessarily of what is a 'good' or 'bad' biometric measurement or match, but rather what is consistent in the history for the user and tailored based on the individual user's biometric data over time.

These methods also apply to high-friction biometrics such as facial recognition. Facial recognition relies on metrics captured of the face and landmarks that determine one or more measurements such as a distance between eyes, nose, size of face, distance to ears, shape of image, etc. These measures are determined based on pictures and compared to a benchmark measurement. The quality of these measures are strongly dependent on a quality of the pictures taken, skill of the user taking the picture of himself/herself, lighting, engagement of the user, etc. The Recursive Frequency List can be used to determine a past history of typical match rates and quality of matches and associated measures variables to determine whether the trend is consistent. As an example, a 'too perfect' match might be the result of the use of a static reference picture, and can be used to easily catch a fraudster in the context of the actual user having only a moderate match rate in their history. Another example is a user that very carefully follows an instruction and takes acceptable pictures of himself or herself (in the right lighting, etc.) and has a consistent error margin in the facial landmark biometric measures, where a set of large mismatches can be easily determined based on a match quality stored in the Recursive Frequency List. These lists allow false positives to be more individually determined.

The Recursive Frequency Lists are stored in a database or NOSQL data store along with a small history of biometric measurements within the device profile. These profiles maintain the variables associated with the biometric use of the device and normalcy, but also utilize the limited history of past biometric measurements for example to track the movement of a user that might imply a geographic trajectory.

Context of Global User Biometrics: A Global View

In addition to the individualized Recursive Frequency Lists that indicate whether a user's biometric data captured is consistent with their past biometric history, how that user's measures compares to the Global population can also be determined. FIG. 2 illustrates a Device profile structure for Biometric measurement variables and Recursive Frequency Lists. As illustrated in FIG. 2, the quantiles associated with biometric profile measures can indicate whether or not the biometric markers for an individual and associated biometric measure variables are outliers compared to the overall population. Biometric markers that are inconsistent with the Recursive Frequency Lists and associated variables for a single individual can be further enhanced with respect to what is normal or abnormal globally—or other words what is the typical range of values for these biometric profile variables across the entire user base? This can be determined recursively through the use of quantile tracking methods for the variables contained in the device biometric profile.

To compute online percentile estimators of the variables, various techniques can be used. One iteration consists of capturing M consecutive observations, where M≥1 is a free parameter. At the n-th iteration, an estimate of $\bar{x}^r$ is updated; this estimate is denoted by $\bar{x}_n^r$ at the n-th iteration. The i-th observation is denoted in the n-th iteration as $x_n^i$, where i is in [1, M]. At the n-th iteration, a density estimate $f_n$ is computed for the variable x at the r-th percentile using the following equation:

$$f_n = (1 - w_n)f_{n-1} + w_n \frac{\sum_{i=1}^{M} 1\{|x_n^i - \bar{x}_{n-1}^r| \le c_n\}}{2c_n M} \quad (1)$$

where $1\{\cdot\}$ is an indicator function that takes the value of 1 if the condition inside the curly brackets is satisfied and 0 otherwise. The series $w_n$ and $c_n$ must satisfy some convergence criteria as detailed in the research papers cited above. Among many others, one choice is $w_n=1/n$ and $c_n=1/\sqrt{n}$.

After $f_n$ is computed, $\bar{x}_n^r$ is obtained as follows:

$$\bar{x}_n^r = \bar{x}_{n-1}^r + w_n \frac{r - \sum_{i=1}^{M} 1\{x_n^i \le \bar{x}_{n-1}^r\}/M}{e_{n-1}} \quad (2)$$

where $e_n = \max\{f_n, f_0/\sqrt{n}\}$ and $f_0$ is an initial value of $f_n$.

Utilizing real-time recursive quantile estimation, the value of each of the biometric profile variables can be recast into dimensionless values expressed in terms of the real-time estimate of the quantiles of a biometric metric profile variable distribution. These transformations are important to allow the variable distribution to change over time and within different segments of users/device types and allow biometric profile variables that have different value ranges to be recast on a common interpreted scale.

One such dimensionless scale is based on outlier variable scaling. To determine the outlier values of the biometric profile variables, the point in the distribution of values of the variables is quantified, where if the variable value exceeds that point it can be considered an outlier. The formula in equation #3 below can be used to produce a simple unconditional re-scaling across all independent variables.

$$q(x_i \mid \theta) \equiv \frac{x_i - \theta_{i,1}}{\theta_{i,2}} \in [0, C] \quad (3)$$

where $((\theta_{i,1}, \theta_{i,2}) \in \theta)$ are location and scale parameters respectively of the computed distribution of independent biometric profile variable $x_i$. The scaled value is bounded between 0 and some constant C to protect the analytics from extreme outlier values.

As an example, a variable Text_Frequency_3Event_20Event could show that texting frequency is 3.2 times the frequency average over the last 20 events, this 3.2 is not easily interpreted but utilizing the global variable distribution could correspond to a value of 97% quantile of the distribution of values across the general population. Utilizing equation #3 where $\theta_1$ is the 95% quantile value and $\theta_2$ the distance between the 97% and the 95% quantiles, the biometric profile variable Text_Frequency_3Event_20Event has a scaled value of q=1.0. Likewise, other biometric variables would have their own unique real-values of values of $\theta_1$ and $\theta_2$ but in the space of $q(x_i|\theta)$ can be compared, for example of 10 biometric profile variables the vector q may take on a value of:

$$q=(0,0,1.0,0,2.5,0,0,0.37,0,0)$$

which indicates that, of 10 different biometric profiling variables, three are above the 95% quantile of their respective profile variable distributions and only two are significant outlier values of 1.0 and 2.5. The following equation indicates one of many methods to take the vector Q above and produce an unsupervised score.

$$\eta = \Sigma w_i q(x_i|t,s) \quad (4)$$

Here the score $\eta$ is the summation of the q values where the variables in the q outlier scaling is based on the segment, S, that the device belongs such IOS, Android, etc. This use of the Segment S scaling is paramount given the differences in device capabilities and quality of biometric measurements based the device characteristics. The weighting $w_i$ of different $q(x_i|t,s)$ can be based on expert knowledge or limited training data such that the score $\eta$ provides a correct ranking of large biometric deviation across a multitude of metrics and does not overemphasize weak biometric indicators. The larger the score $\eta$, the more substantial the deviation and consequently, the need for investigation.

Biometric Score Based on Data Outcomes—a Supervised Standalone Biometric Profile Score One preferred method of utilizing biometric profiling is to blend with an existing fraud practice/score. This section discusses a method to generate a standalone bio-metric score when such a pre-existing fraud score is not available to blend. The stand-alone score will utilize known fraud and non-fraud attempts to derive an outcome-based score based on actual customer biometric use.

In utilizing outcome-based data, recent historical production outcomes of fraud and non-fraud can be aggregated with the associated biometric variable values (or ranges) to determine the likelihood of fraud based on fraud and non-fraud history in the stream. This is most easily obtained utilizing Bayes theorem. In this implementation, fraud and non-fraud tables are maintained, and the values of the bio-metric profile variables are binned, such that the continuous values of the variables fall into discrete bins. It is important to note for biometric profile based variables that it is naïve to think larger or smaller values are necessarily more or less risky; the risk associated with the values of the biometric-based values will be nonlinear and typically non-monotonic which makes Bayes formulation advantageous.

Figure 3:
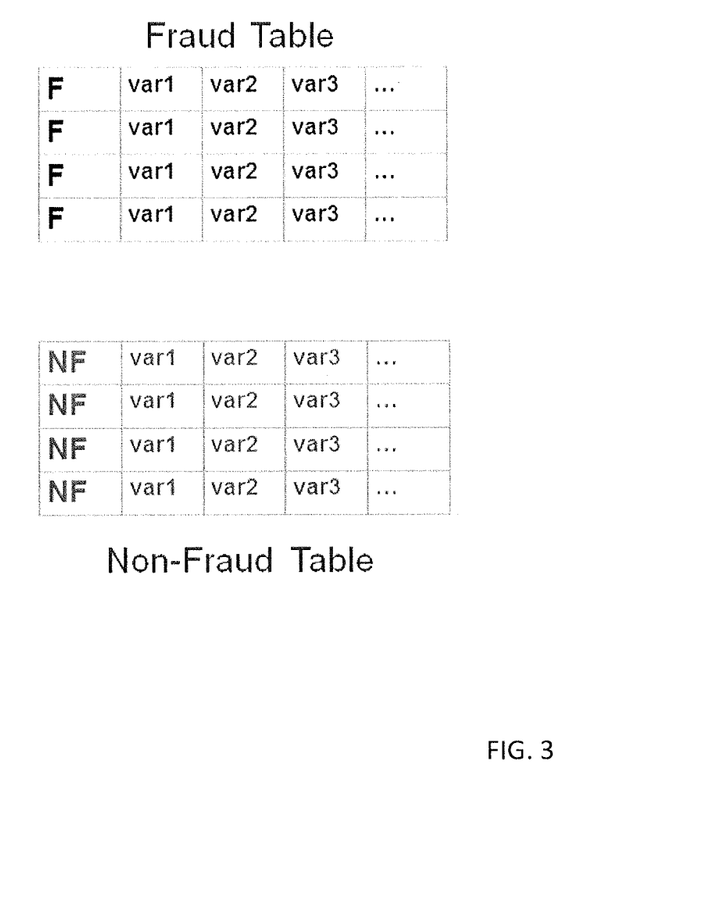
FIG. 3 illustrates a fraud and non-fraud table of biometric measures profile variable value samples utilized for the use of computing probabilities of fraud based on biometric profile measures data.

FIG. 3 shows the tables of recent fraud and non-fraud exemplars and the values of the raw biometric profile variables associated with the fraud and non-fraud exemplars when takeover of the device had occurred or suspected fraud occurred.

Based on the data contained in the tables of FIG. 3, the probability of fraud can be determined by the Bayes formula. Each record in the tables contains the values of the biometric variables which can be used to determine the likelihood of observing a value of the biometric profile variable value in the fraud or non-fraud table. The model directly utilizes the fraud and non-fraud tables to compute how similar the record is to exemplars of fraud and non-fraud contained in the tables. This will allow us to compute P(X|fraud) and P(X|nonfraud), which are the probability of observing the value of X in the fraud table (P(X|fraud)) and the probability of observing the value of X in the non-fraud table (P(X|nonfraud)). This provides a probability of observing the variable values X in each table, and Bayes rule is then utilized.

$$P(\text{fraud} | X) = \frac{P(X | \text{fraud})P(\text{fraud})}{(P(X | \text{fraud})P(\text{fraud}) + P(X | \text{nonfraud})P(\text{nonfraud}))} \quad (5)$$

Formula #5 provides an estimate of the probability of fraud given the value of X.

The formula above is easy to interpret in the limits, for example if the value of 0.7 for the facial match rate is seen with the same probability of $\Lambda$ in both the fraud and non-fraud table, P(X|fraud)=P(X|nonfraud)=$\Lambda$ and with the recognition that P(nonfraud)=1−P(fraud), then equation #5 reduces to P(fraud|X)=P(fraud). In other words, the value of 0.7 for the facial match rate is meaningless and doesn't change the overall probability of fraud as that value of 0.7 is seen equally see in the fraud and non-fraud tables.

Another extreme would be if the value of 0.85 for the facial match variable is 100× more likely in the fraud table then the non-fraud table, then the formula trends P(X|fraud) to 1. If the facial match rate of 0.85 is 100× more likely in the non-fraud table than in the fraud table, then the formula trends to 0.

The Bayes formula provides a data driven way to obtain estimates of probabilities of fraud for each of the biometric profile variables and their specific variable values based on domain specific tables of values for fraud and non-fraud instances. This method has the advantage in that it is self-learning based on the values of variables stored in the tables. This biometric profile analytic probability could then be used directly in the determination of the likelihood that a device is being taken over, and provide indication that further actions are required on subsequent transactions or out-of-band on a payment card transaction. Where there are a small number of records, the formula above can be approximated by a product of single valued probabilities, for example where there are several estimates of fraud probability based on a single variable Xi.

$$P(\text{fraud} | X) = \prod_{1}^{N} P_i(\text{fraud} | X_i) \quad (6)$$

The method above allows either a vector or product of scalar approximations of the fraud probability to be used to determine a probability of fraud/takeover based on the biometric profiling variables.

Biometric Score Based on Data Outcomes—a Blended Biometric Profiling Enhanced Score As discussed before, optimally fraud prediction associated with the biometric monitoring would be used to enhance already existing scores, such as the Falcon Fraud Manager score. This score is highly predictive but does not utilize a variety of bio-metric measures. The ability to blend the scores is paramount to enhancing the value of score and minimizing the false positives associated with biometrics alone. As discussed previously, false positives will reduce the uptake of biometric measures or drive customers to lower friction channels. High levels of accuracy in the score and low false positives are essential for the success of utilizing biometric variables in decisioning in the general population.

Many score blending algorithms exist, these include simply averaging scores, using a linear or logistic regression model to determine the score blending, or binning both scores and determining the probability of fraud in every cell in the 2-dimensional table containing all possible combinations of the bins on the two scores. Each has its advantages and disadvantages. The simple average is not optimal if the two scores have differing statistical strengths and the dual binning approach takes smooth scores and changes them into discrete values that are potentially statistically noisy. The regression approach is one that is most easily implemented given ongoing fraud and non-fraud data aggregation. Firstly the fraud score is translated to log-odds space where:

$$\Omega = \ln\left(\frac{P(\text{fraud})}{1 - P(\text{fraud})}\right) = \ln\left(\frac{E(\text{score})}{1 - E(\text{score})}\right) \quad (7)$$

where E( ) is the expected value where 0 represents non-fraud and 1 represents fraud. This transformation can also be done for each probability measure for the biometric profile variable analytics described above and an improved score can be represented as:

$$\Omega' = \Omega + \sum_{1}^{N} \alpha_i \ln\left(\frac{P_i(\text{fraud} \mid X_i)}{1 - P_i(\text{fraud} \mid X_i)}\right) \quad (8)$$

Where training based on fraud and non-fraud exemplars would allow the $\alpha_i$ to be learned from historical data. The improved value of the score is then inverted to be:

$$P'(\text{fraud}) = \frac{1}{(1 + \exp(-\Omega'))} \quad (9)$$

This allows the prior fraud score P(fraud) mud) to be enhanced with the biometric profiling variables to produce an improved supervised score P'(fraud). In this way, the estimate allows the operations to not change substantially in terms of case volume as the score distributions are more stable in terms of the number of high scoring cases, but those cases are now more predictive in terms of true fraud flagged at the high score region. Equation #8 can be periodically retrained as the quality of the biometrics change over time, and has the advantage that in log-odds space one needs not worry about the calibration issues associated with combining scores. The method above is ideal for enhancing a strong base score, such as a Falcon Fraud Manager Fraud score, where the value of this score is statistically very significantly stronger than the other biometric predictors.

Biometric Score General Applications: Understanding Archetypes Based on Biometric Profiling The analytic classification of fraud or authentication is an important problem, and one for which the use of profiling of biometric measures and abnormalities is described. However, the use cases associated with biometric profiling are considerably larger than fraud, authentication, and abuse. Examples include, but not limited to, biometric data profiling for health monitoring, location based services, marketing, and a variety of Know Your Customer (KYC) applications. In all these applications, it is essential to look at each biometric stream of data and profile the individual markers in the biometric stream and create biometric profile measures to form archetypes based on the biometric data. For example, based on time/day and steps walked, it can be determined when and how often people exercise, and to form archetypes of motion/exercise. This data can then be coupled with other data around consumption of meals/snacks or application information to determine how sedentary one's lifestyle is, or, coupled with known health data could point to a lack of adherence to medically prescribed and preventive exercise.

Collaborative filtering techniques can be used to determine 'archetypes' of streams of biometric markers whether it be latitude/longitude location, application use or health-related markers: pulse, heart rate, glucose, and other medical markers collected throughout the day. This data can then be aggregated to determine the archetypes associated with the user of the device.

The variety of biometric markers and profile measures can be collected and aggregated into a multitude of streams, with each having their own particular attributes. Although appearing individualized, there are some certain regularities of classes of users' biometric marker data and associated biometric profile measures that can be learned using a model trained on a large database of the biometric streams. To determine the classes of user's biometric marker streams, a high dimensional space of streams of biometric markers can be used to build models that translate from the observed biometric profile measure space to a lower dimensional 'archetype' space, which encompass the modes of collective behaviors typically seen in the biometric stream data. A preferred implementation is to model the observed data with a statistical "topic model", a set of techniques originally developed, but not limited to, document classification. In this setting, the "words" are equated to the directly observed discrete biometric marker data and derived profile variables as described above and "topics" are the imputed archetypes estimated by the topic model.

In some implementations, a Latent Dirichlet Allocation (LDA) model is used, which is a Bayesian probabilistic method that simultaneously estimates probability distributions over archetypes (topics) to each of the profiled entities, and a probability distribution of biometric markers and derived biometric profile variables (words) is generated for each topic. The latter, in the form of a matrix for a LDA model, is called the "model" and represents collective behaviors relating observed biometric marker data and profile variables to discovered archetypes. The number of archetypes is usually substantially lower than the cardinality of the word space so it can be considered a dimensionality reduction method.

These archetypes have been shown to be highly interpretable. Therefore, for example, measurements of glucose levels may point to groups of individuals at various stages of diabetes. Coupling the archetype that a patient falls into based on recent biometric glucose markers with archetypes such as diet and exercise could determine whether or not poor diet or lack of exercise contributed to less preferred glucose levels. Reviewing the steps/heart rate can give indications whether or not an exercise program is being adhered to. Other information such as application use and/or motion may give indications on how and when a person may be most receptive to motivational messages/directives. Outside of the medical space, understanding the applications installed and used on mobile devices, coupled with location data, can allow for real-time marketing to be performed based on low-friction biometrics captured to improve a customer experience and make offers more relevant in both type of offer and the location/time of offer.

When using the LDA model in scoring mode, the archetype loadings is updated in real-time within the transaction profile of the user/device. An algorithm to accomplish this is described in U.S. patent application Ser. No. 14/566,545, entitled "Collaborative Profile-Based Detection Of Behavioral Anomalies And Change-Points," incorporated herein by reference in its entirety, and which supports the use of analytic techniques to allow for profiling of biometric marker data and associated profile biometric measures, and for utilizing real-time collaborative profiling to determine archetypes based on streaming biometric data. This reference discusses a method for recursively updating the archetypes in a user's transaction profile as data streams into a scoring model. Utilizing these techniques allows a set of real-time profile-based biometric 'archetypes' to be continually maintained/refined as real-time biometric data is monitored.

Real-time profiles of archetypes and changes in the archetypes can be determined with each newly received biometric marker to track the archetypes and determine where messaging, marketing, or intervention is required. The ability to profile the biometric markers and derived biometric profile variables in real-time and determine the real-time archetypes allocation of behavior is important for making real-time relevant analytic driven decisions on individuals.

Figure 4:
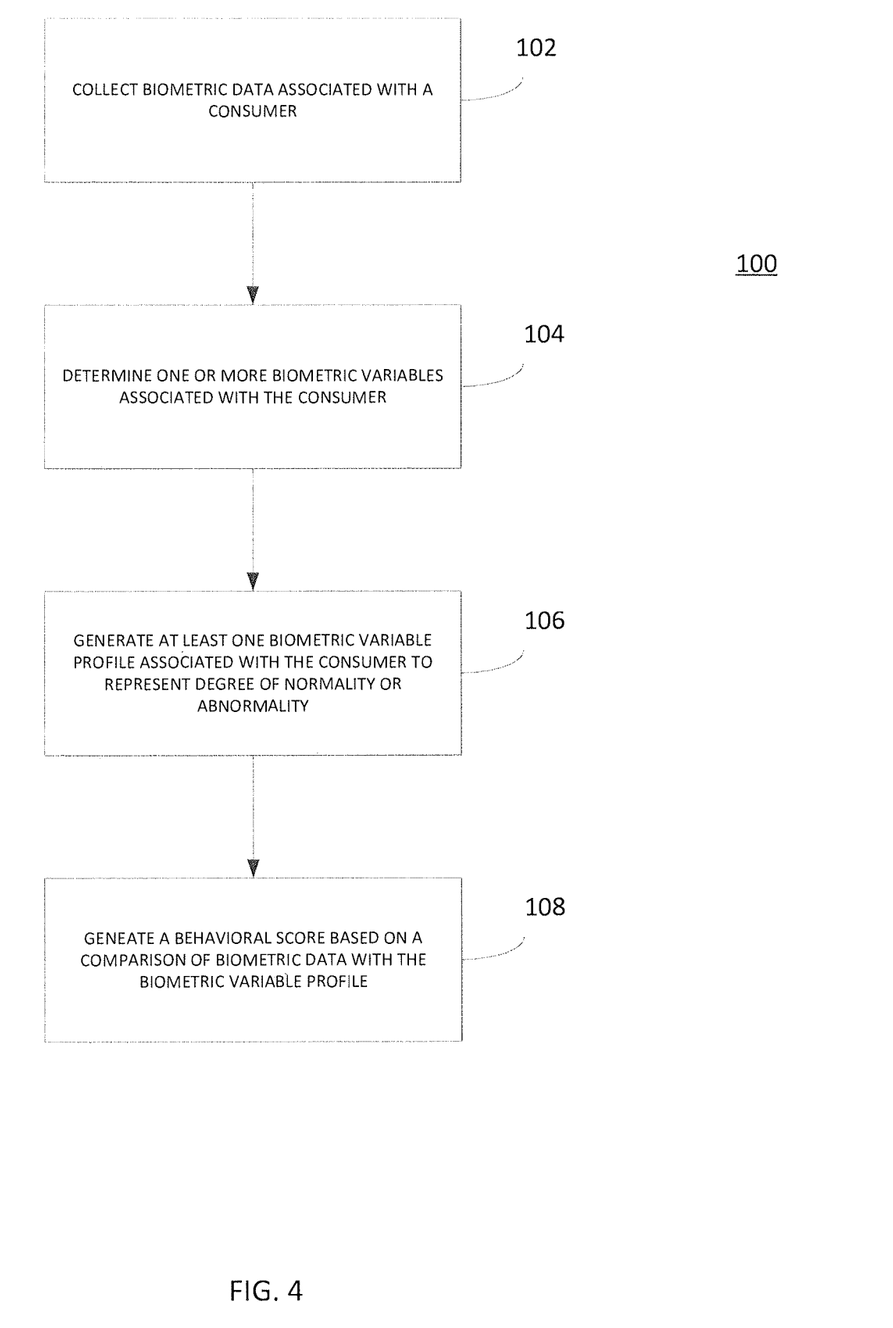
FIG. 4 illustrates the process flow of collecting biometric data, computing biometric measures and associated biometric measures profile variables, and computing the biometric behavioral score.

FIG. 4 is a flowchart of a method 100 of executing biometric measures profiling analytics in accordance with some implementations of the subject matter described herein. At 102, biometric data associated with a consumer is collected by a capturing device connected with at least one programmable processor, or at least one special-purpose data processor. At 104, one or more biometric variables associated with the consumer are determined. Each of the one or more biometric variables represent a measurable aspect of the biometric data, as described above. At 106, based on at least one of the one or more biometric variables, at least one biometric variable profile associated with the consumer is generated. The at least one biometric variable profile represents a degree of normality or abnormality of the collected and calibrated biometric data as compared to a biometric history of the consumer. At 108, a behavioral score for the consumer is generated based on a comparison of the collected and calibrated biometric data with the biometric variable profile. The behavioral score represents a degree of risk of normality or abnormality of an event associated with the biometric data.

The behavioral score based on the biometric data can be used to determine archetypes of behavior among a number of consumers, in collaborative profiling technology to determine those archetypes, and/or for profiling the biometric data over time or among an aggregated set of biometric events. Such methods can also be used to classify consumers based on their profiles or archetypes, and generate distributions to point to changes in direction or shifts in the archetypes, which can in turn point to possible intervention with respect to any particular consumer.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:

collecting, by a capturing device connected with at least one data processor, biometric data associated with a consumer;

determining, by the at least one data processor, one or more biometric variables associated with the consumer, the one or more biometric variables representing a measurable aspect of the biometric data;

generating, by the at least one data processor using a model and based on at least one of the one or more biometric variables, at least one biometric profile variable associated with the consumer, the at least one biometric profile variable representing a first degree of normality of the collected biometric data as compared to a biometric history of the consumer, the model employing a recursive frequency list (RFL) to summarize a history of the biometric data, the RFL comprising a number table, a frequency table, and a ranking table, the model also distinguishing between normal and abnormal biometric measurements of the capturing device based on a history of biometric measurements of the capturing device;

performing real-time recursive quantile estimation on values of the at least one biometric profile variable to generate an estimate of quantiles of a biometric metric profile variable distribution, the performing including recasting the values of the at least one biometric profile variable into dimensionless values expressed in terms of a real-time estimate of the quantiles of the biometric metric profile variable distribution;

comparing, by the at least one data processor, the biometric data associated with the consumer with data associated with a global population;

calculating, by the at least one data processor and based on the comparing, at least one scaled value of the at least one biometric profile variable, the at least one scaled value indicating whether a value of the at least one biometric profile variable comprises an outlier value, the outlier value comprising a value above a threshold quantile of the biometric metric profile variable distribution determined from the overall population;

generating, by the at least one data processor, a behavioral score for the consumer based on the collected biometric data, the at least one scaled value, and the at least one biometric profile variable, the behavioral score representing a second degree of normality of a biometric event associated with the biometric history of the consumer and the global biometric profile variable;

defining, by the at least one data processor, one or more archetypes for the consumer based on the biometric data and the behavioral score, the one or more archetypes defined utilizing real-time collaborative profiling based on streaming biometric data collected from the capturing device;

blending, by the at least one data processor, the behavioral score with a fraud score to generate a blended fraud score, the fraud score indicating a probability of fraud for a transaction associated with the consumer, the blending including applying a regression model to blend the behavioral score with the fraud score; and authenticating, by the at least one data processor and based on the blended fraud score and the one or more archetypes, the transaction associated with the consumer.

2. The method in accordance with claim 1, further comprising generating, by the at least one data processor, the biometric history from a collection of biometric data and an event history over a time period, wherein the biometric data comprises low-friction biometric data including destination numbers called at the capturing device, texts sent or received at the capturing device, MMS messages sent or received at the capturing device, a URL visited by the capturing device, Apps running on the capturing device, data downloaded at the capturing device, data requested by the capturing device, location of the capturing device, Wifi networks connected by the capturing device, gyro position of the capturing device, step motion of the capturing device, power on/power off of the capturing device, jail broken status of the capturing device, sleep mode of the capturing device, system setting changes on the capturing device, and/or keystroke monitoring/swipes at the capturing device.

3. The method in accordance with claim 1, further comprising:

aggregating, by the at least one data processor, one or more streams of biometric markers from a plurality of consumers; and associating, by the at least one data processor, the aggregated one or more streams of biometric markers and the at least one biometric profile variable to the defined one or more archetypes.

4. The method in accordance with claim 3, further comprising:

generating, by the at least one data processor, a model based on the one or streams of biometric markers and the at least one biometric profile variable; and associating, by the at least one data processor, the collected biometric data and the at least one biometric profile variable with at least one of the defined one or more archetypes based on the model.

5. The method in accordance with claim 4, further comprising associating, by the at least one data processor, the behavior score with the one or more archetypes to augment one or more biometric profile variables.

6. The method in accordance with claim 1, further comprising generating, by the at least one data processor, a fraud risk score for the biometric measurement based at least in part on the behavioral score, the fraud score representing a degree of risk that the biometric event is associated with a fraudulent behavior.

7. The method in accordance with claim 6, further comprising augmenting, by the at least one data processor, the fraud score with at least one different biometric behavioral score.

8. A method comprising:

generating, by at least one data processor, a fraud risk score for a transaction by a consumer, the fraud risk score representing a degree of risk that the transaction is associated with a fraudulent behavior;

collecting, by a capturing device connected with at least one data processor, biometric data associated with a consumer;

determining, by the at least one data processor, one or more biometric variables associated with the consumer, the one or more biometric variables representing a measurable aspect of the biometric data;

generating, by the at least one data processor using a model and based on at least one of the one or more biometric variables, at least one biometric profile variable associated with the consumer, the at least one biometric profile variable representing a first degree of normality of the collected biometric data as compared to a biometric history of the consumer, the model employing a recursive frequency list (RFL) to summarize a history of the biometric data, the RFL comprising a number table, a frequency table, and a ranking table, the model also distinguishing between normal and abnormal biometric measurements of the capturing device based on a history of biometric measurements of the capturing device;

performing real-time recursive quantile estimation on values of the at least one biometric profile variable to generate an estimate of quantiles of a biometric metric profile variable distribution, the performing including recasting the values of the at least one biometric profile variable into dimensionless values expressed in terms of a real-time estimate of the quantiles of the biometric metric profile variable distribution;

comparing, by the at least one data processor, the biometric data associated with the consumer with data associated with a global population;

calculating, by the at least one data processor and based on the comparing, at least one scaled value of the at least one biometric profile variable, the at least one scaled value indicating whether a value of the at least one biometric profile variable comprises an outlier value, the outlier value comprising a value above a threshold quantile of the biometric metric profile variable distribution determined from the overall population;

generating, by the at least one data processor, a behavioral score for the consumer based on the collected biometric data, the at least one scaled value, and the at least one biometric profile variable, the behavioral score representing a second degree of normality of a biometric event associated with the biometric history of the consumer and the global biometric profile variable;

augmenting, by the at least one data processor, the fraud risk score with the behavioral score to generate an augmented score, the augmented score representing the degree of risk that the transaction is associated with the fraudulent behavior and the second degree of normality of the event associated with the biometric data;

defining, by the at least one data processor, one or more archetypes for the consumer based on the biometric data and the behavioral score, the one or more archetypes defined utilizing real-time collaborative profiling based on streaming biometric data collected from the capturing device;

blending, by the at least one data processor, the behavioral score with a fraud score to generate a blended fraud score, the fraud score indicating a probability of fraud for a transaction associated with the consumer, the blending including applying a regression model to blend the behavioral score with the fraud score; and authenticating, by the at least one data processor and based on the augmented score and the one or more archetypes, a transaction associated with the consumer.

9. The method in accordance with claim 8, wherein the event associated with the biometric history of the consumer and the global biometric profile variable is part of the transaction, wherein the outlier variable comprises a variable above a threshold quantile of the distribution.

10. The method in accordance with claim 8, further comprising generating, by the at least one data processor, the biometric history from a collection of biometric data and an event history over a time period.

11. The method in accordance with claim 8, further comprising defining, by the at least one data processor, one or more archetypes for the consumer based on the biometric data and the at least one biometric profile variable.

12. The method in accordance with claim 11, further comprising:
aggregating, by the at least one data processor, one or more streams of biometric markers and the at least one biometric profile variable from a plurality of consumers; and
associating, by the at least one data processor, the aggregated one or more streams of biometric markers and the at least one biometric profile variable to the defined one or more archetypes.

13. The method in accordance with claim 12, further comprising:
generating, by the at least one data processor, a model based on the one or streams of biometric markers and the at least one biometric profile variable; and
associating, by the at least one data processor, the collected biometric data and the at least one biometric profile variable with at least one of the defined one or more archetypes based on the model.

14. The method in accordance with claim 11, further comprising associating, by the at least one data processor, the fraud score and the behavior score with the one or more archetypes to augment one or more biometric profile variables.

15. A system comprising:
at least one programmable processor; and
a machine-readable medium storing instructions that, when executed by the at least one processor, cause the at least one programmable processor to perform operations comprising:
collecting, by a capturing device connected with at least one data processor, biometric data associated with a consumer;
determining, by the at least one data processor, one or more biometric variables associated with the consumer, the one or more biometric variables representing a measurable aspect of the biometric data;
generating, by the at least one data processor using a model and based on at least one of the one or more biometric variables, at least one biometric profile variable associated with the consumer, the at least one biometric profile variable representing a first degree of normality of the collected biometric data as compared to a biometric history of the consumer, the model employing a recursive frequency list (RFL) to summarize a history of the biometric data, the RFL comprising a number table, a frequency table, and a ranking table, the model also distinguishing between normal and abnormal biometric measurements of the capturing device based on a history of biometric measurements of the capturing device;
performing real-time recursive quantile estimation on values of the at least one biometric profile variable to generate an estimate of quantiles of a biometric metric profile variable distribution, the performing including recasting the values of the at least one biometric profile variable into dimensionless values expressed in terms of a real-time estimate of the quantiles of the biometric metric profile variable distribution;
comparing, by the at least one data processor, the biometric data associated with the consumer with data associated with a global population;
calculating, by the at least one data processor and based on the comparing, at least one scaled value of the at least one biometric profile variable, the at least one scaled value indicating whether a value of the at least one biometric profile variable comprises an outlier value, the outlier value comprising a value above a threshold quantile of the biometric metric profile variable distribution determined from the overall population;

generating, by the at least one data processor, a behavioral score for the consumer based on the collected biometric data, the at least one scaled value, and the at least one biometric profile variable, the behavioral score representing a second degree of normality of a biometric event associated with the biometric history of the consumer and the global biometric profile variable;

defining, by the at least one data processor, one or more archetypes for the consumer based on the biometric data and the behavioral score, the one or more archetypes defined utilizing real-time collaborative profiling based on streaming biometric data collected from the capturing device;

blending, by the at least one data processor, the behavioral score with a fraud score to generate a blended fraud score, the fraud score indicating a probability of fraud for a transaction associated with the consumer, the blending including applying a regression model to blend the behavioral score with the fraud score; and authenticating, by the at least one data processor and based on the blended fraud score and the one or more archetypes, the transaction associated with the consumer.

16. The system in accordance with claim 15, wherein the operations by the at least one programmable processor further comprise generating the biometric history from a collection of biometric data and an event history over a time period, wherein the outlier variable comprises a variable above a threshold quantile of the distribution.

17. The system in accordance with claim 15, wherein the operations by the at least one programmable processor further comprise defining one or more archetypes for the consumer based on the biometric data and the at least one biometric profile variable.

18. The system in accordance with claim 17, wherein the operations by the at least one programmable processor further comprise:

aggregating one or more streams of biometric markers and the at least one biometric profile variable from a plurality of consumers; and associating the aggregated one or more streams of biometric markers and the at least one biometric profile variable to the defined one or more archetypes.

19. The system in accordance with claim 18, wherein the operations by the at least one programmable processor further comprise:

generating a model based on the one or streams of biometric markers and the at least one biometric profile variable; and associating the collected biometric data and the at least one biometric profile variable with at least one of the defined one or more archetypes based on the model.

20. The system in accordance with claim 15, wherein the operations by the at least one programmable processor further comprise generating a fraud risk score for the event based at least in part on the behavioral score, the fraud score representing a degree of risk that the event is associated with a fraudulent behavior.

21. The method in accordance with claim 1,
wherein defining, by the at least one data processor, one or more archetypes for the consumer based on the biometric data and the behavioral score comprises defining, using real-time collaborative profiling of a plurality of consumers to define one or more archetypes of the consumer based on the biometric data and the at least one biometric profile variable, the method further comprising:

determining a change in the one or more archetypes of the consumer based on the at least one scaled value indicating that the value of the at least one biometric profile variable comprises the outlier value; and intervening with the consumer based on the determined change in the one or more archetypes of the consumer and the authenticating.

22. The method in accordance with claim 1, further comprising:

calculating, by the at least one data processor, an unsupervised score by summing the at least one device capability scaled value.

23. The method in accordance with claim 22, further comprising:

determining, by the at least one data processor, a need for investigation based on the unsupervised score.

* * * * *